(12) United States Patent
Châtenay et al.

(10) Patent No.: US 11,454,732 B1
(45) Date of Patent: Sep. 27, 2022

(54) 3-AXIS SEISMIC SENSOR STAKE, SYSTEM AND METHOD

(71) Applicant: Explor Geophysical Ltd., Calgary (CA)

(72) Inventors: Allan Robert Châtenay, Calgary (CA); Joshua Gilbert Barnet Abbott, Chestermere (CA); Selina Ashley Samodien, Calgary (CA); John Gerard Bouska, Calgary (CA); Cameron Rankin, Calgary (CA)

(73) Assignee: Explor Geophysical Ltd., Calgary (CA)

( * ) Notice: Subject to any disclaimer, the term of this patent is extended or adjusted under 35 U.S.C. 154(b) by 65 days.

(21) Appl. No.: 17/217,773

(22) Filed: Mar. 30, 2021

(51) Int. Cl.
*G01V 1/16* (2006.01)
*G01V 1/18* (2006.01)
*G01V 1/20* (2006.01)

(52) U.S. Cl.
CPC ............... *G01V 1/162* (2013.01); *G01V 1/16* (2013.01); *G01V 1/166* (2013.01); *G01V 1/18* (2013.01); *G01V 1/201* (2013.01)

(58) Field of Classification Search
CPC .......... G01V 1/162; G01V 1/16; G01V 1/166; G01V 1/18
See application file for complete search history.

(56) References Cited

U.S. PATENT DOCUMENTS

| | | |
|---|---|---|
| 2,705,314 A | 3/1955 | Gaby |
| 3,930,218 A | 12/1975 | Hall, Jr. |
| 7,424,928 B2 | 9/2008 | Cox |
| RE43,666 E | 9/2012 | Stephen |
| 10,241,219 B2 | 3/2019 | Friedly et al. |
| 10,408,954 B2 | 9/2019 | Edme |
| 10,545,254 B2 | 1/2020 | Faber et al. |

(Continued)

FOREIGN PATENT DOCUMENTS

| | | | |
|---|---|---|---|
| CA | 2832241 A1 * | 11/2014 | ............. G01V 1/166 |
| EP | 2229595 B1 | 9/2010 | |

(Continued)

OTHER PUBLICATIONS

Kendall, Rob; "Cableless Seismic Acquisition", Focus article, CSEG Recorder, vol. 40, No. 10 (Year: 2015).*

(Continued)

*Primary Examiner* — Ian J Lobo
(74) *Attorney, Agent, or Firm* — David Guerra

(57) ABSTRACT

A seismic sensor stake, system and method configured to orientate three seismic 1C sensors orthogonally in the X, Y, and Z directions. The present technology stake is configured to efficiently and effectively convert three independent seismic sensors into a single three seismic sensor unit. Multiple stakes can be inserted into the ground of a geographical area to provide highly accurate seismic survey of subterranean hydrocarbon formations. Each seismic sensor can include a slot that slidable receives a threaded member of a mounting sides of the stake. A retaining nut can secure the seismic sensor in place upon rotation of the sensor. A stake bit can be utilized with an impact hammer to form holes in hard or frozen ground for quick insertion of the stake into the ground.

19 Claims, 5 Drawing Sheets

(56) References Cited

U.S. PATENT DOCUMENTS

2014/0126329 A1\* 5/2014 Guyton .................. G01V 1/247
367/76
2014/0219051 A1\* 8/2014 Pavel .................... G01V 1/162
367/14

FOREIGN PATENT DOCUMENTS

WO          2015136057 A1   3/2014
WO     WO-2019079600 A1 \*  4/2019

OTHER PUBLICATIONS

Hansford Sensors, Single Axis vs Triaxial Accelerometers, https://www.hansfordsensors.com/blog/2018/12/17/triaxial-vs-single-axis-accelerometers/.
Althen Sensors and Controls, 7130A Multi Axis Accelerometer, Endevco 2228C | Triaxial Miniature Piezoelectric Accelerometer, https://www.althensensors.com/sensors/acceleration-sensors/iepe-accelerometers/14622/7130a-multi-axis-accelerometer/.
BesTech Sensors & Teaching Equipment, Model : 080A180 | Accessory for Vibration Division Product, https://www.bestech.com.au/product/endevco-2228c-triaxial-miniature-piezoelectric-accelerometer/.
PCT Piezotronics, Model : 080A180 | Accessory for Vibration Division Product, https://www.pcb.com/products?m=080A180.
STI Vibration Monitoring Inc., CMCP200T Triaxial Mounting Block, https://www.stiweb.com/Accelerometer_Mounting_Pads_p/cmcp200t.htm.

\* cited by examiner

3-AXIS SEISMIC SENSOR STAKE, SYSTEM AND METHOD

BACKGROUND

Technical Field

The present technology relates to a 3-axis seismic sensor stake, system and method for use in connection with converting three independent seismic sensors into a single three-axis seismic sensor unit.

Background Description

Seismic survey technologies are commonly used to explore and develop resources for the petrochemical industry. To meet the continuing demand for petrochemical products, subterranean oil and gas reserves must be accurately located and surveyed, for efficient and effect extraction. As a result, new seismic sensor systems and more advanced exploration technologies have been developed.

Seismic data are typically gathered during a survey using an array of detectors. The differences between the different types of surveying are considerable, mainly of the different propagation characteristics of different physical environments. Different problems exist, and have different effects to mitigate, in different surveying environments. For instance, land surveys are subjected to unwanted propagation, including shear waves (also known as S-waves) and Love waves, which are not experienced in marine surveying. As such, different hardware and different data processing techniques are used in the different surveying environments.

There are many wave types detected by land survey sensors. For example, there are S-waves, Love waves, P-waves (also known as primary waves, because they are the first detected after an earthquake) and Rayleigh waves. Rayleigh and Love waves are horizontally-propagating surface waves, whereas S-waves and P-waves propagate through bodies and thus are of most interest to seismological surveyors. P-waves are compressional waves, Rayleigh waves have a complex motion involving compressional modes and S-waves and Love waves have no compressional component.

To increase accuracy, Triaxial (3C) Accelerometers may be utilized, however, these known devices are expensive. When utilized in the hundreds or thousands to survey a given geographical area, the cost of using such devices can be extremely high. The use of single axis seismic sensors is more affordable but provide incomplete recording of ground movement, that is typically restricted to the vertical axis of motion.

All current 3C seismic recorder implementations use three, orthogonally mounted, seismic sensors (geophones or MEMS devices) permanently installed within in a single container housing. The housing is then either connected to an external recorder/battery via wires, or in more modern devices the recorder and battery are co-located, along with three sensors, within the housing.

Historically, using cabled systems a three component sensor (3 sensors in a single housing) would have a wire(s) connected to three channels of a communication cable that continued to a distant central recording truck (doghouse)

This current state of art: the practice of combining three sensors, with 3 channel digital recording electronics and single battery has previously been required for a number of reasons:

To reduce overall size, lower weight and provide better portability compared to three individually housed sensors Reduced duplication (single battery, electronics and GPS timing module)

To improve consistency among/across the three sensors and recorded data both in terms of digital sample timing but also mutual orthogonality of the collected waveforms For these reasons, seismic sensors have historically been available in two distinct formats: single component (1C, smaller/lighter/cheaper), and three-component (3C larger heavier expensive). The choice of 1C or 3C depends on the what type of data is needed for a particular exploration project: 1C Pressure wave imaging, 3C P-wave and converted Shear Wave recording/imaging (C-wave). It is more expensive to use 3C, because it either requires three time the number of channels on a cable crew, or use of 3C nodes, which are more expensive, bigger, heavier, and consume battery power more quickly (shorter deployment time). It is expensive to keep both types (1C and 3C) of sensors in inventory since thousands may be required for given survey site.

To date, the industry does not attempt to use 1C devices to mimic 3C recording, because of cumbersome deployment, and danger of inconsistent recording among individual 1C channels.

Industrial tri-axis accelerometer mounting schemes (for machine and structure vibration monitoring) typically use machined metal/steel blocks with threaded mounts, however these are intended for permanent installations, and are not suitable for rapid field re-deployment. These industrial solutions also require wired connection to an external multi-channel data logging recorder. Further, these known mounting blocks are not intended for insertion into, or placement on, the ground.

Generally, these blocks are in rectangular or cubic form, with opposite faces milled flat and parallel, and adjacent sides milled orthogonal to each other. Such blocks are never equipped with spikes or prongs for implementation in soil.

Convertibility of single component, autonomous recorders between 1C and 3C implementations requires methods and apparatus to facilitate rapid, accurate, repeatable field deployment of 1C sensors in a 3C configuration to provide close coupling of all three orthogonal sensors to each other, and the ground, so that minute ground motion is accurately sensed and recorded with full vector fidelity, without installation of the sensors into any form of external cowling, shroud, or housing.

To effectively utilize 1C sensors in a 3C implementation, the devices must be capable of conversion on site, in the field, at the point of sensor deployment, in as short a time frame as possible. The devices must be small, light and inexpensive.

The 3C devices must have mechanism and method of insertion and coupling to the earth which will permit precise orientation for both the vertical axis of the sensor, as well as rotation of the horizontal components such that the X and Y sensors can be oriented to pre-determined angles with respect to geographic compass directions.

The devices must be designed such that after insertion in the earth, both the vertical orientation, as well as the horizontal rotational position, will remain as originally inserted and intended, and able to maintain these critical orientations independent of weather conditions, animal interference, or other unintended meddling.

After deployment, the apparatus must ensure the sensors are well coupled to the earth surface, and capable of recording very low amplitude vibrations without interference (resonances or attenuation) from the coupling mechanism.

While the above-described devices fulfill their respective, particular objectives and requirements, the aforementioned devices or systems do not describe a 3-axis seismic sensor stake that allows converting three independent seismic sensors into a single 3-axis seismic sensor unit.

A need exists for a new and novel 3-axis seismic sensor stake that can be used for converting three independent seismic sensors into a single 3-axis seismic sensor unit. In this regard, the present technology substantially fulfills this need. In this respect, the 3-axis seismic sensor stake according to the present technology substantially departs from the conventional concepts and designs of the prior art, and in doing so provides an apparatus primarily developed for the purpose of converting three independent seismic sensors into a single 3-axis seismic sensor unit.

SUMMARY

In view of the foregoing disadvantages and restrictions inherent in the known types of 1C sensor mounting blocks, the present technology provides a novel 3-axis seismic sensor stake, and overcomes one or more of the mentioned disadvantages and drawbacks of the prior art. As such, the general purpose of the present technology, which will be described subsequently in greater detail, is to provide a new and novel 3-axis seismic sensor stake and method which has all the advantages of the prior art mentioned heretofore and many novel features that result in a 3-axis seismic sensor stake which is not anticipated, rendered obvious, suggested, or even implied by the prior art, either alone or in any combination thereof.

According to one aspect, the present technology can include a seismic sensor stake including a top mounting side, a first mounting side and a second mounting side. The top mounting side can include a top retaining member configured to secure a first seismic sensor to the top mounting side along a top axis parallel with a longitudinal axis of the seismic sensor stake. The first mounting side can include an angled end and a first retaining member configured to secure a second seismic sensor to the first mounting side along a first axis orthogonal with the top axis. The second mounting side can include an angled end and a second retaining member configured to secure a third seismic sensor to the second mounting side along a second axis orthogonal with the top axis and the first axis. The angled end of the first mounting side and the second mounting side can converge toward each other.

According to another aspect, the present technology can include a seismic sensor stake system for orientated three single-axis seismic sensors along three independent and separate axes. The seismic sensor stake system can include a top mounting side, a first mounting side and a second mounting side. The top mounting side can include a top threaded member and a top retaining nut engageable with the top threaded member and configured to secure a first seismic sensor to the top mounting side along a top axis parallel with a longitudinal axis of the seismic sensor stake. The first mounting side can include an angled end, a first threaded member and a first retaining nut engageable with the first threaded member and configured to secure a second seismic sensor to the first mounting side along a first axis orthogonal with the top axis. The second mounting side can include an angled end, a second threaded member and a second retaining nut engageable with the second threaded member and configured to secure a third seismic sensor to the second mounting side along a second axis orthogonal with the top axis and the first axis. The angled end of the first mounting side and the second mounting side can converge toward a single tip.

According to still another aspect, the present technology can include a seismic sensor stake system for orientated three single-axis seismic sensors along three independent and separate axes. The seismic sensor stake system can include a top mounting side, a first mounting side, a second mounting side, and a stake bit. The top mounting side can include a top threaded member and a top retaining nut engageable with the top threaded member and configured to secure a first seismic sensor to the top mounting side along a top axis parallel with a longitudinal axis of the seismic sensor stake. The first mounting side can include an angled end, a first threaded member and a first retaining nut engageable with the first threaded member and configured to secure a second seismic sensor to the first mounting side along a first axis orthogonal with the top axis. The second mounting side can include an angled end, a second threaded member and a second retaining nut engageable with the second threaded member and configured to secure a third seismic sensor to the second mounting side along a second axis orthogonal with the top axis and the first axis. The stake bit can include a shank end and a stake bit end. The stake bit end can have a shape corresponding with the first mounting side and the second mounting side. The angled end of the first mounting side and the second mounting side can converge toward a single tip.

In some or all embodiments, the top retaining member, the first retaining member and the second retaining member can each include a threaded member and a retaining nut engageable with the threaded member, respectively.

In some or all embodiments, the threaded member of the top retaining member, the first retaining member and the second retaining member can each be configured to be received in a slot defined in the first seismic sensor, the second seismic sensor and the third seismic sensor, respectively.

In some or all embodiments, the retaining nut of the top retaining member, the first retaining member and the second retaining member can each be configured to be rotatable upon rotation of the first seismic sensor, the second seismic sensor and the third seismic sensor when assembled with the top threaded member, the first threaded member and the second threaded member, respectively.

In some or all embodiments, the top mounting side can include a notch defined in an edge of the top mounting side. The notch can be configured to allow welding of the top mounting side to an edge of the first mounting side adjacent to the notch.

In some or all embodiments, the angled end of the first mounting side and the second mounting side can be configured for insertion into the ground.

Some or all embodiments of the present technology can include a stake bit including a shank end and a stake bit end. The stake bit end can have a shape corresponding with the first mounting side and the second mounting side.

In some or all embodiments, the stake bit end can be configured for insertion into the ground to create a hole in the ground corresponding with the first mounting side and the second mounting side for insertion of the seismic sensor stake into the ground.

There has thus been outlined, rather broadly, features of the present technology in order that the detailed description thereof that follows may be better understood and in order that the present contribution to the art may be better appreciated.

Numerous objects, features and advantages of the present technology will be readily apparent to those of ordinary skill in the art upon a reading of the following detailed description of the present technology, but nonetheless illustrative, embodiments of the present technology when taken in conjunction with the accompanying drawings.

As such, those skilled in the art will appreciate that the conception, upon which this disclosure is based, may readily be utilized as a basis for the designing of other structures, methods and systems for carrying out the several purposes of the present technology. It is, therefore, that the claims be regarded as including such equivalent constructions insofar as they do not depart from the spirit and scope of the present technology.

It is another object of the present technology to provide a new and novel 3-axis seismic sensor stake that may be easily and efficiently manufactured, transported and marketed.

An even further object of the present technology is to provide a new and novel 3-axis seismic sensor stake that has a low cost of manufacture with regard to both materials and labor, and which accordingly is then susceptible of low prices of sale to the consuming public, thereby making such 3-axis seismic sensor stake economically available to the buying public.

These together with other objects of the present technology, along with the various features of novelty that characterize the present technology, are pointed out with particularity in the claims annexed to and forming a part of this disclosure. For a better understanding of the present technology, its operating advantages and the specific objects attained by its uses, reference should be made to the accompanying drawings and descriptive matter in which there are illustrated embodiments of the present technology. Whilst multiple objects of the present technology have been identified herein, it will be understood that the claimed present technology is not limited to meeting most or all of the objects identified and that some embodiments of the present technology may meet only one such object or none at all.

BRIEF DESCRIPTION OF THE DRAWINGS

The present technology will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE EMBODIMENTS

Figure 1:
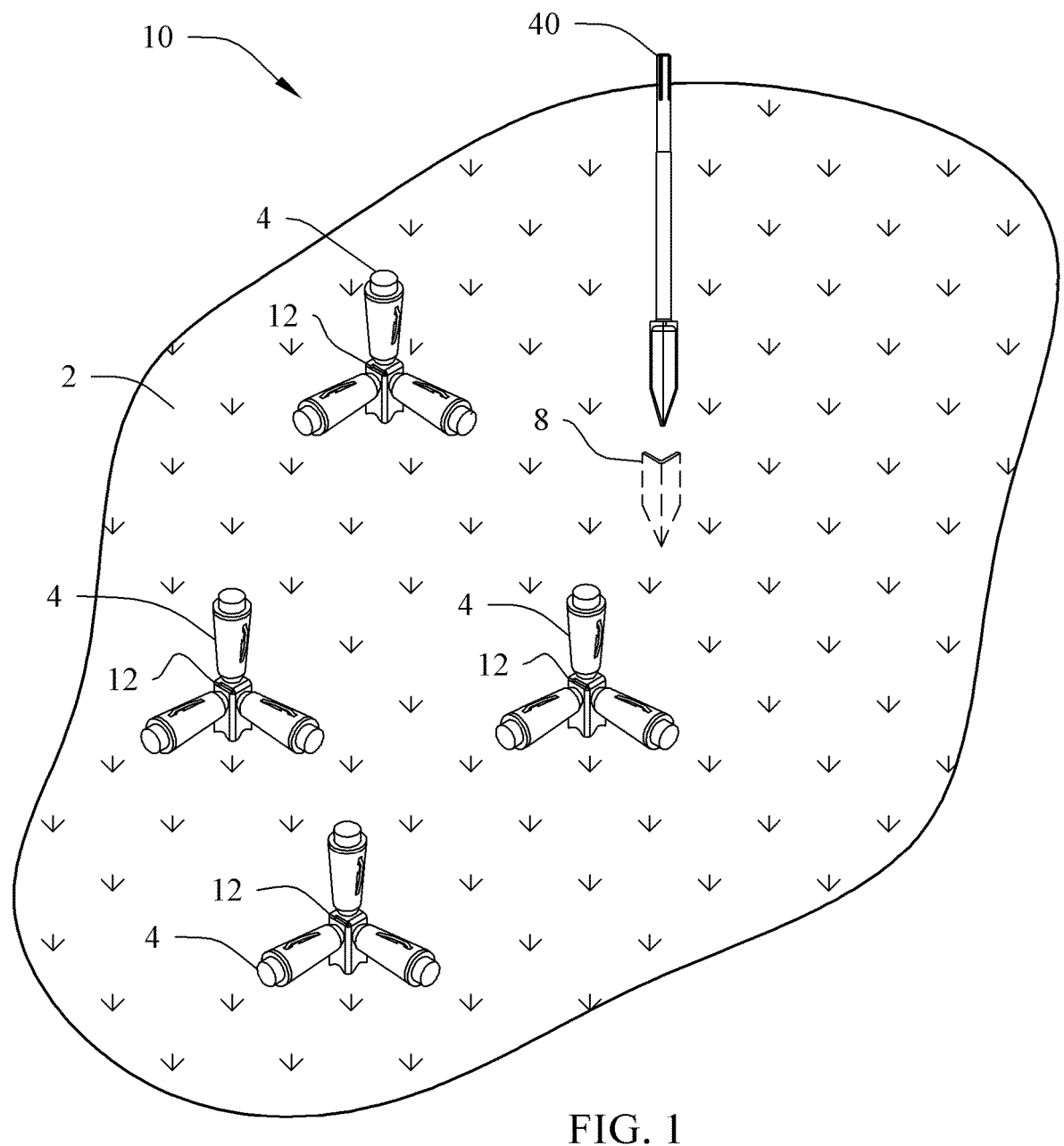
FIG. 1 is a perspective view of an embodiment of the 3-axis seismic sensor stake system constructed in accordance with the principles of the present technology, illustrating multiple 3-axis seismic sensor stakes inserted into the ground, and the stake bit creating a hole for receiving the stake.

In the following description, for purposes of explanation and not limitation, specific details are set forth, such as particular embodiments, procedures, techniques, etc. in order to provide a thorough understanding of the present technology. However, it will be apparent to one skilled in the art that the present technology may be practiced in other embodiments that depart from these specific details.

Referring now to the drawings, and particularly to FIGS. 1-9, an embodiment of the 3-axis seismic sensor stake of the present technology is shown and generally designated by the reference numeral 10.

In FIG. 1, a new and novel 3-axis seismic sensor stake system 10 of the present technology for converting three independent seismic sensors into a single three-axis seismic sensor unit is illustrated and will be described. More particularly, the 3-axis seismic sensor stake system 10 can include a stake 12, and a stake bit 40. The stake 12 may be configured to attachably receive three single axis sensors 4 each oriented in the X, Y, and Z directions. Multiple stakes 12 can be inserted into the ground of a geographical area 2 to provide highly accurate seismic survey.

The stake bit 40 can be an integral hammer bit configured to either drive a stake 12 into the ground or create a hole 8 configured to receive the stake 12. The use of the stake bit 40 can be substantially useful when inserting the stake 12 into hard or frozen ground. It can be appreciated that an end of the stake bit 40 can be attachable to a driving or reciprocating tool, or simply manually hammered.

The present technology system and method 10 can be utilized for reflection seismology intended for mapping subterranean formations. To collect seismic survey data in the field or geographical area 2 to be surveyed, a plurality (tens, hundreds or thousands) of ground seismometers 4 can be positioned at predetermined locations in or on the field 2. The most commonly used seismometer 4 can be a small, portable single component geophone that is planted into the earth and which converts vertical ground motion into a small analog electrical signal. Of late, such sensors have been manufactured with GPS receivers locally coupled to the sensor as well as a battery and sufficient memory to record the signals detected by each sensor continuously for a period of several weeks.

It can be appreciated that the stake 12 provides a cost effective solution in place of using 3C sensors. The present technology thereby providing better seismic data and new opportunities for sub-surface imaging.

Ground motion can then be created with small explosive charges positioned inside a borehole drilled into the surface of the earth at a variable angle and/or a depth that can be variably determined based on local conditions, or any other seismic source. The angle of the borehole can be configured to facilitate generation of shear waves. Further, the explosive charge can be detonated on or above the surface. The timing and position of these seismic sources should be very accurate, timed to the fraction of a millisecond, with positions accuracies ranging from with 5 metres to less than a metre depending on the geophysical acquisition objectives.

As the seismic waves of ground motion created by the seismic source travels through the earth, they reflect and refract off subsurface geological layers. At the boundary between each geological layer, some energy will be reflected and the rest of the energy will continue through the boundary. As these reflected and refracted signals are detected by the three 1C seismometers 4 on the stake 12 at the surface, they are either recorded locally into the digital memory coupled to the sensor or they are transmitted either via cable or wireless transmission to a central recording system (not shown) that records all of the reflected ground motion detected by all of the seismometers 4 at the surface.

By processing these data, a highly detailed image of subsurface layers of the field 2 can be created. This enables geophysicists, geologists and engineers to interpret and understand the subsurface layers with advantages over other imaging technology.

Figure 6:
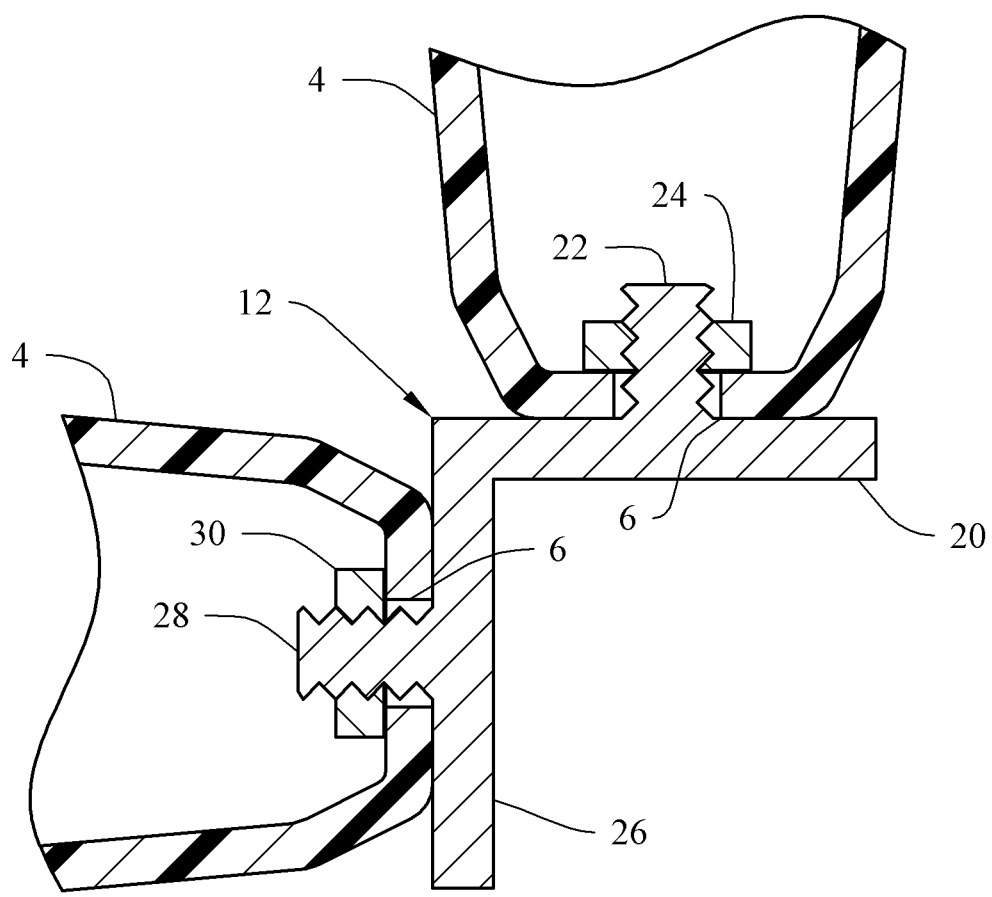
FIG. 6 is a cross-section view of the 3-axis seismic sensor stake taken along line 6-6 in FIG. 3.

The present technology allows three seismic 1C sensors or nodes 4, for example but not limited to, STRYDE nodes or other nodes that may be developed in future that also have a slot 6 (as best illustrated in FIG. 6) at the base of the node, to be attached to the spike or stake 12 orthogonally in the X, Y, and Z directions. The present technology stake 12 is configured to efficiently and effectively convert three independent seismic sensors 4 into a single three seismic sensor unit, without the additional costs associated with a dedicated 3C sensor.

Figure 2:
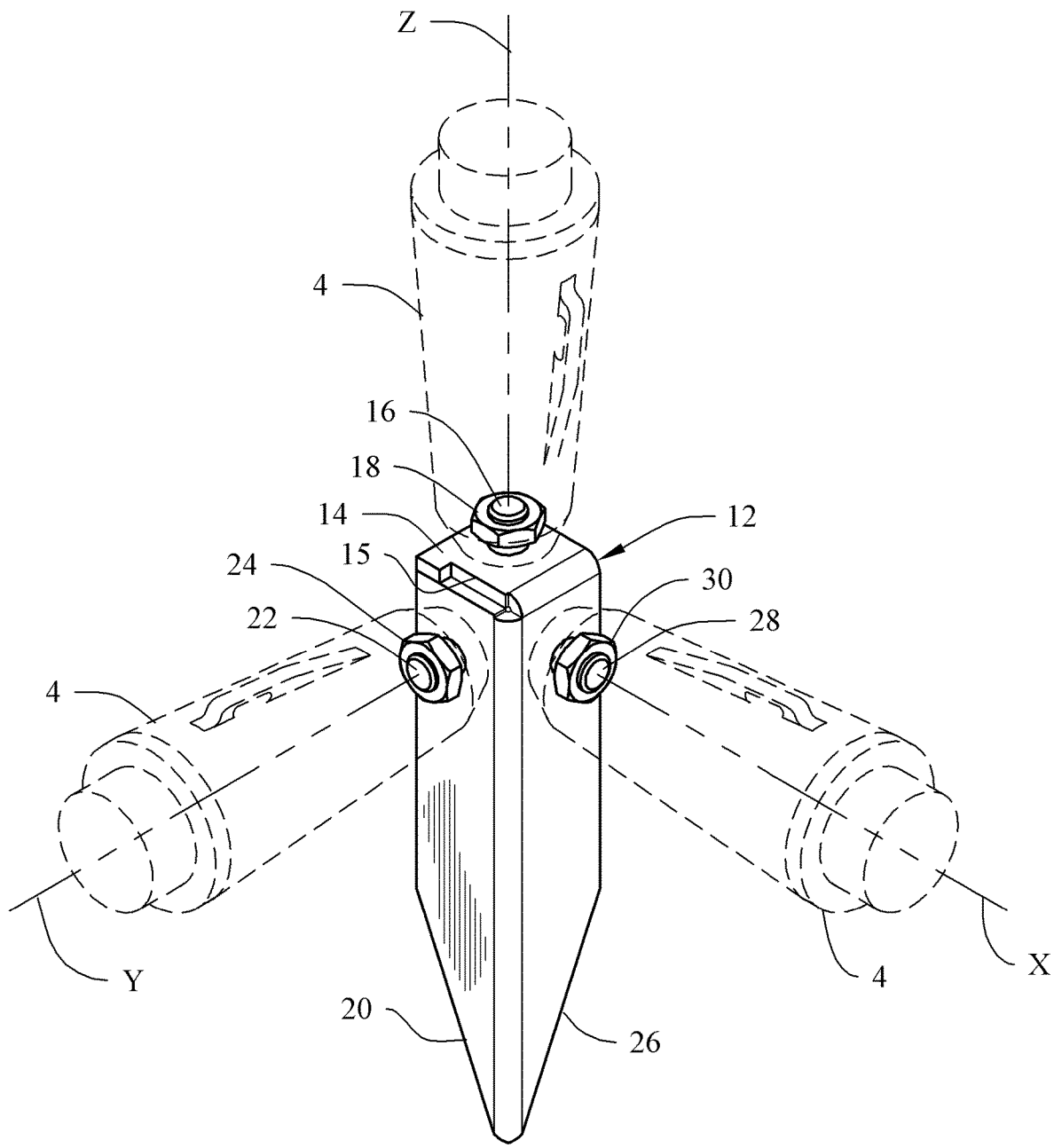
FIG. 2 is a perspective view of the 3-axis seismic sensor stake of the present technology, with the phantom lines depicting environmental structure and forming no part of the claimed present technology.
Figure 3:
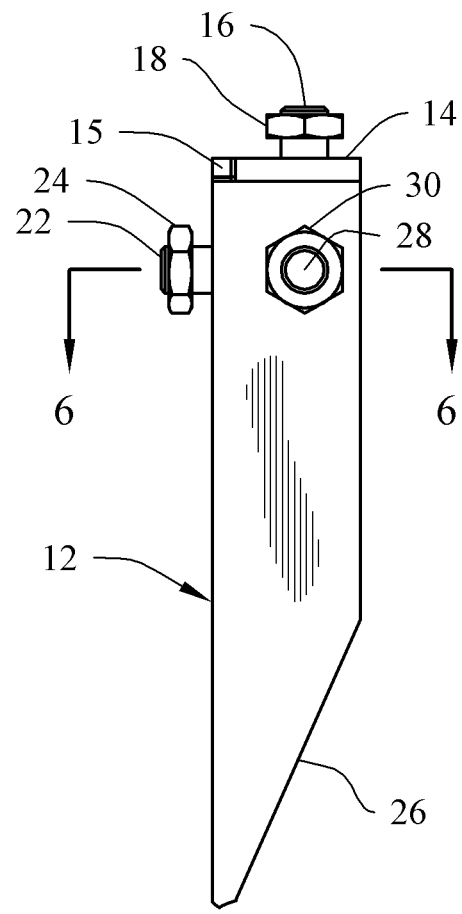
FIG. 3 is a front elevational view of the 3-axis seismic sensor stake of the present technology.
Figure 4:
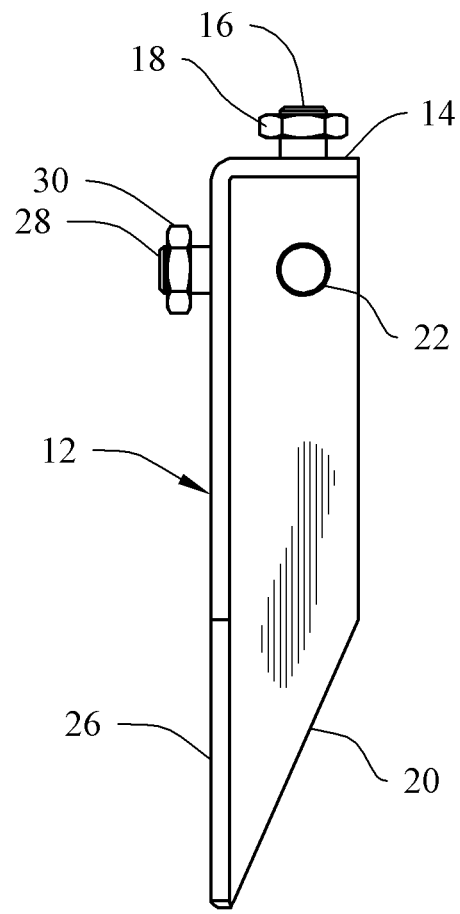
FIG. 4 is a right elevational view of the 3-axis seismic sensor stake of the present technology.
Figure 5:
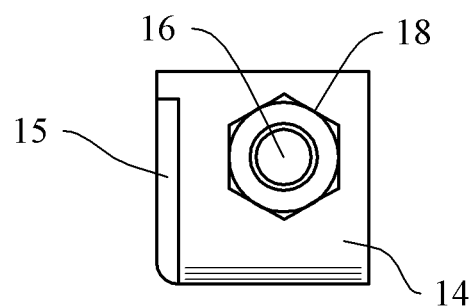
FIG. 5 is a top plane view of the 3-axis seismic sensor stake of the present technology.

Referring to FIGS. 2-4, the stake 12 can include a top mounting side 14, a first mounting side 20 orthogonal to the top mounting side 14, and a second mounting side 26 orthogonal to the top mounting side 14 and the first mounting side 20. It can be appreciated that the top mounting side 14 can be orientated in the Z-direction, the first mounting side 20 can be orientated in the Y-direction and the second mounting side 26 can be orientated in the X-direction. It can further be appreciated that the first mounting side 20 can be oriented in the X-direction with the second mounting side 26 being oriented in the Y-direction.

The top mounting side 14, the first mounting side 20, and the second mounting side 26 can integrally formed or molded into a stake, or can being bend from a blank sheet of material to form a desired stake shape. The stake 12 can be made from any suitable material such as, but not limited to, metals, plastics, alloys and the like.

In the exemplary, the top mounting side 14 can be folded over from either the first or second mounting sides 20, 26, and can include a notch 15 defined in an edge thereof allowing for the top mounting side 14 to be welded to a corresponding and adjacent first or second mounting sides 20, 26. A threaded member 16 extends away from the top mounting side 16. The threaded member 16 can be integral with, attached to or extending through a bore of the top mounting side 14. A retaining nut 18 can be engaged with the threaded member 16 to create a gap between the top mounting surface 14 and the nut 18.

In the exemplary, the first mounting side 20 can be folded over from the second mounting side 26, and can be planar in form with a tapered or angled end. A threaded member 22 extends away from the first mounting side 20. The threaded member 22 can be integral with, attached to or extending through a bore of the first mounting side 20. A retaining nut 24 can be engaged with the threaded member 22 to create a gap between the first mounting surface 20 and the nut 24.

The second mounting side 26 can be planar in form with a tapered or angled end, so that the angled ends of the first and second mounting sides 20, 26 converge to a single tip or point. It can be appreciated that an auger-like tip can extend from the first mounting side 20 and/or the second mounting side 26, thereby allowing the stake 12 to be rotated/screwed into the ground 2 either by hand or by a rotating tool such as a drill.

A threaded member 28 extends away from the second mounting side 26. The threaded member 28 can be integral with, attached to or extending through a bore of the second mounting side 26. A retaining nut 30 can be engaged with the threaded member 28 to create a gap between the second mounting surface 26 and the nut 30.

It can be appreciated that an open cavity is an interior defined below the top mounting side 14 and between the first and second mounting sides 20, 26. This cavity allow for easy insertion of the angled ends of the first and second mounting sides 20, 26 into the ground so that the threaded members 22, 28 are at a distance above the ground.

Referring to FIG. 6, the gap formed between the nuts 18, 24, 30 and the top mounting side 14 and the first and second mounting sides 20, 26, respectively, are adjustable and configured so that a slot 6 defined in a base of the seismic sensor 4 can receive the threaded member 16, 22, 28. The nuts 18, 24, 30 and the threaded members 16, 22, 28 are configured to quickly and effectively secure the sensor 4 to the stake 12 along the X, Y and X directions. It can be appreciated that hooks, tabs, mechanical fasteners, snapes, clamps and the like can be utilized in place of the nuts and threaded members.

In the exemplary, to attach the sensor 4 to the stake 12, the slot 6 is simply inserted between the top mounting side 14 and the first and second mounting sides 20, 26 and its respective nut 18, 24, 30, and then twisted to tightly secure the sensor 4 to the stake 12.

With the sensors 4 secured to all three axis of the stake 12, enables the sensors 4 to record the full seismic wavefield instead of simply recording the vertical component consisting primarily of P-waves. The stake 12 allows three 1C component seismic sensors to be utilized as a 3C sensor without requiring a new housing of the sensor 4 or modifying its existing housing.

Figure 7:
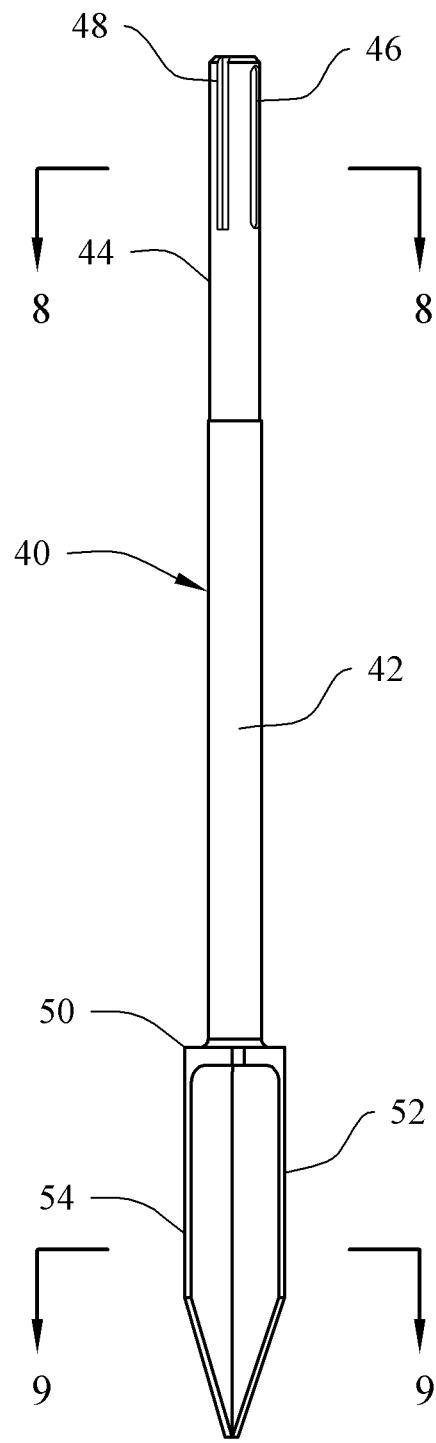
FIG. 7 is a front elevational view of the stake bit of the present technology.
Figure 8:
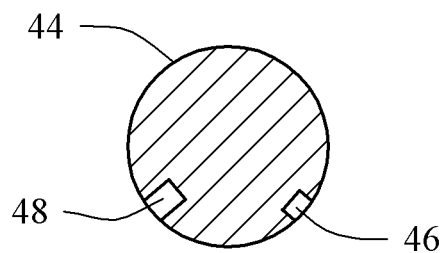
FIG. 8 is a cross-section view of the stake bit taken along line 8-8 in FIG. 7.
Figure 9:
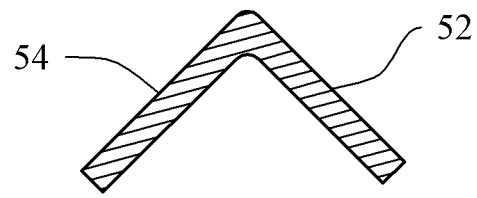
FIG. 9 is a cross-section view of the stake bit taken along line 9-9 in FIG. 7.

Referring to FIGS. 7-9, the stake bit 40 can be utilized to press the spike into hard or frozen ground or create a hole 8 capable of receiving the stake 12. The stake bit 40 can include a shaft 42 with a shank end 44. The shank end 44 can include Slotted Drive Shaft or Slotted Drive System (SDS) end to work with an SDS impact hammer. The shank end 44 can include notches and/or grooves 46, 48, as best illustrated in FIG. 8, engageable with the SDS impact hammer or any other impact.

The stake bit 40 further includes a stake bit end 50 having a first stake side 52 and a second stake side 52 each with tapered or angled ends that converge to a single tip. It can be appreciated that the stake bit end 50 has a shape corresponding to that of the first and second mounting sides 20, 26 of the stake 12, as best illustrated in FIG. 9. The stake bit end 50 is at an end of the shaft 42 opposite to that of the shank end 48.

In the exemplary, the shank end 48 is attached to the impact hammer, and then inserts the stake bit end 50 into the earth. The hammer is activated, thereby diving the stake bit end 50 into the ground. The stake bit end can then be pulled out of the ground, leaving a perfectly formed hole 8 for the stake 12 to be inserted into for excellent coupling.

It can also be appreciated that by first rotating the hammer or drill, with the stake bit end 50 attached, such that both the mounting sides 20 and 26 will face towards the desired horizontal X and Y directions, then the subsequent hole 8 left when the stake bit end 50 is removed, will ensure correct, and unambiguous orientation of the three 3C sensors 4 when they are inserted into the hole.

It can be appreciated that the stake bit 40 can be provided with the stake or stakes 12 as a kit, or separate from the stake 12.

With the above in mind, the present technology combines three independent, self-contained, single component (1C), P-wave data-logging sensors into a stable, portable, re-deployable, multi-component (3C) sensor system, without relying on external housing encasement or separate digital recording and battery power connections.

According, the present technology reduces the overall size, lowers weight and provides better portability compared to three individually housed sensors. Typically, 3C sensors are larger and heavier that 1C sensors. It further reduces duplication (single battery, electronics and GPS timing module) over know systems.

Still further, the present technology can improve consistency among/across the three sensors and recorded data both in terms of digital sample timing but also mutual orthogonality of the collected waveforms.

Further yet, the non-circular, open frame 90 degree bent shape of the stake 12 helps ensure that the correct horizontal rotation direction of the 3C system is achieved and maintained for the entire the recording duration.

Additional advantages of using three 1C sensors as per the present technology is that it more cost effective over 3C sensors since it is more expensive to use 3C sensors in that they use three times the number of channels on a cable crew.

The present technology provides convertibility of single component, autonomous recorders between 1C and 3C implementations requires methods and apparatus to facilitate rapid, accurate, repeatable field deployment of 1C sensors in a 3C configuration to provide close coupling of all three orthogonal sensors to each other, and the ground, so that minute ground motion is accurately sensed and recorded with full vector fidelity, without installation of the sensors into any form of external housing.

The stake 12 further provides quick and efficient conversion on site, in the field, at the point of sensor deployment, in as short a time frame.

After deployment, the stake 12 ensures the sensors 4 are well coupled to the earth surface, and capable of recording very low amplitude vibrations without interference (resonances or attenuation) from the coupling mechanism.

According to one aspect, the present technology can include a seismic sensor stake 12 including a top mounting side 14, a first mounting side 20 and a second mounting side 26. The top mounting side 14 can include a top retaining member 16, 18 configured to secure a first seismic sensor 4 to the top mounting side 14 along a top axis Z parallel with a longitudinal axis of the seismic sensor stake 12. The first mounting side 20 can include an angled end and a first retaining member 22, 24 configured to secure a second seismic sensor 4 to the first mounting side 20 along a first axis Y orthogonal with the top axis Z. The second mounting side 26 can include an angled end and a second retaining member 28, 30 configured to secure a third seismic sensor 4 to the second mounting side 26 along a second axis X orthogonal with the top axis Z and the first axis X. The angled end of the first mounting side 20 and the second mounting side 26 can converge toward each other.

According to another aspect, the present technology can include a seismic sensor stake system 10 for orientated three single-axis seismic sensors 4 along three independent and separate axes X, Y, Z. The seismic sensor stake system can include a seismic stake 12 including a top mounting side 14, a first mounting side 20 and a second mounting side 26. The top mounting side 14 can include a top threaded member 16 and a top retaining nut 18 engageable with the top threaded member 16 and configured to secure a first seismic sensor 4 to the top mounting side 14 along a top axis parallel Z with a longitudinal axis of the seismic sensor stake 12. The first mounting side 20 can include an angled end, a first threaded member 22 and a first retaining nut 24 engageable with the first threaded member 22 and configured to secure a second seismic sensor 4 to the first mounting side 20 along a first axis Y orthogonal with the top axis Z. The second mounting side 26 can include an angled end, a second threaded member 28 and a second retaining nut 30 engageable with the second threaded member 28 and configured to secure a third seismic sensor 4 to the second mounting side 26 along a second axis X orthogonal with the top axis Z and the first axis Y. The angled end of the first mounting side 20 and the second mounting side 26 can converge toward a single tip.

According to still another aspect, the present technology can include a seismic sensor stake system 10 for orientated three single-axis seismic sensors 4 along three independent and separate axes X, Y, Z. The seismic sensor stake system can include a seismic stake 12 including a top mounting side 14, a first mounting side 20, a second mounting side 26, and a stake bit 40. The top mounting side 14 can include a top threaded member 16 and a top retaining nut 18 engageable with the top threaded member 16 and configured to secure a first seismic sensor 4 to the top mounting side 14 along a top axis parallel Z with a longitudinal axis of the seismic sensor stake 12. The first mounting side 20 can include an angled end, a first threaded member 22 and a first retaining nut 24 engageable with the first threaded member 22 and configured to secure a second seismic sensor 4 to the first mounting side 20 along a first axis Y orthogonal with the top axis Z. The second mounting side 26 can include an angled end, a second threaded member 28 and a second retaining nut 30 engageable with the second threaded member 28 and configured to secure a third seismic sensor 4 to the second mounting side 26 along a second axis X orthogonal with the top axis Z and the first axis Y. The stake bit 40 can include a shank end 44 and a stake bit end 50. The stake bit end 50 can have a shape 52, 54 corresponding with the first mounting side 20 and the second mounting side 26. The angled end of the first mounting side 20 and the second mounting side 26 can converge toward a single tip.

In some or all embodiments, the top retaining member, the first retaining member and the second retaining member can each include a threaded member 16, 22, 28 and a retaining nut 18, 24, 30 engageable with the threaded member, respectively.

In some or all embodiments, the threaded member 16, 22, 28 of the top retaining member, the first retaining member and the second retaining member can each be configured to be received in a slot 6 defined in the first seismic sensor 4, the second seismic sensor 4 and the third seismic sensor 4, respectively.

In some or all embodiments, the retaining nut 18, 24, 30 of the top retaining member, the first retaining member and the second retaining member can each be configured to be rotatable upon rotation of the first seismic sensor 4, the second seismic sensor 4 and the third seismic sensor 4 when assembled with the threaded member 16, 22, 28, respectively.

In some or all embodiments, the top mounting side 14 can include a notch 15 defined in an edge of the top mounting side 14. The notch 15 can be configured to allow welding of the top mounting side 14 to an edge of the first mounting side 20 adjacent to the notch 15.

In some or all embodiments, the angled end of the first mounting side 20 and the second mounting side 26 can be configured for insertion into the ground 2.

Some or all embodiments of the present technology can include a stake bit 40 including a shank end 44 and a stake bit end 50. The stake bit end 50 can have a shape 52, 54 corresponding with the first mounting side 20 and the second mounting side 26.

In some or all embodiments, the stake bit end 50 can be configured for insertion into the ground 2 to create a hole 8 in the ground 2 corresponding with the first mounting side 20 and the second mounting side 26 for insertion of the seismic sensor stake 12 into the ground 2.

While embodiments of the 3-axis seismic sensor stake have been described in detail, it should be apparent that modifications and variations thereto are possible, all of which fall within the true spirit and scope of the present technology. With respect to the above description then, it is to be realized that the optimum dimensional relationships for the parts of the present technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present technology. For example, any suitable sturdy material may be used instead of the above-described. And although converting three independent seismic sensors into a single three-axis seismic sensor unit have been described, it should be appreciated that the 3-axis seismic sensor stake herein described is also suitable for mounting any individual device or multiple devices or sensor(s) along the X, Y and Z axis to the ground.

Therefore, the foregoing is considered as illustrative only of the principles of the present technology. Further, since numerous modifications and changes will readily occur to those skilled in the art, it is not desired to limit the present technology to the exact construction and operation shown and described, and accordingly, all suitable modifications and equivalents may be resorted to, falling within the scope of the present technology.

What is claimed as being new and desired to be protected by Letters Patent of the United States is as follows:

1. A seismic sensor stake comprising:
    a top mounting side including a top retaining member configured to secure a first seismic sensor to the top mounting side along a top axis parallel with a longitudinal axis of the seismic sensor stake;
    a first mounting side including an angled end and a first retaining member configured to secure a second seismic sensor to the first mounting side along a first axis orthogonal with the top axis; and
    a second mounting side including an angled end and a second retaining member configured to secure a third seismic sensor to the second mounting side along a second axis orthogonal with the top axis and the first axis;
    wherein the angled end of the first mounting side and the second mounting side converge toward each other.

2. The seismic sensor stake according to claim 1, wherein the top retaining member, the first retaining member and the second retaining member each include a threaded member and retaining nut engageable with the threaded member, respectively.

3. The seismic sensor stake according to claim 2, wherein the threaded member of the top retaining member, the first retaining member and the second retaining member each are configured to be received in a slot defined in the first seismic sensor, the second seismic sensor and the third seismic sensor, respectively.

4. The seismic sensor stake according to claim 3, wherein the retaining nut of the top retaining member, the first retaining member and the second retaining member each are configured to be rotatable upon rotation of the first seismic sensor, the second seismic sensor and the third seismic sensor when assembled with the threaded member, respectively.

5. The seismic sensor stake according to claim 1, wherein the top mounting side includes a notch defined in an edge of the top mounting side, the notch being configured to allow welding of the top mounting side to an edge of the first mounting side adjacent to the notch.

6. The seismic sensor stake according to claim 1, wherein the angled end of the first mounting side and the second mounting side are configured to insertion into the ground.

7. A seismic sensor stake system for orientated three single-axis seismic sensors along three independent and separate axes, the seismic sensor stake system comprising:
    a seismic sensor stake comprising:
        a top mounting side including a top threaded member and a top retaining nut engageable with the top threaded member and configured to secure a first seismic sensor to the top mounting side along a top axis parallel with a longitudinal axis of the seismic sensor stake;
        a first mounting side including an angled end, a first threaded member and a first retaining nut engageable with the first threaded member and configured to secure a second seismic sensor to the first mounting side along a first axis orthogonal with the top axis; and
        a second mounting side including an angled end, a second threaded member and a second retaining nut engageable with the second threaded member and configured to secure a third seismic sensor to the second mounting side along a second axis orthogonal with the top axis and the first axis;
    wherein the angled end of the first mounting side and the second mounting side converge toward a single tip.

8. The seismic sensor stake system according to claim 7, wherein the top threaded member, the first threaded member and the second threaded member each are configured to be received in a slot defined in the first seismic sensor, the second seismic sensor and the third seismic sensor, respectively.

9. The seismic sensor stake system according to claim 8, wherein the top retaining nut, the first retaining nut and the second retaining nut each are configured to be rotatable upon rotation of the first seismic sensor, the second seismic sensor and the third seismic sensor when assembled with the top threaded member, the first threaded member and the second threaded member, respectively.

10. The seismic sensor stake system according to claim 7, wherein the top mounting side includes a notch defined in an edge of the top mounting side, the notch being configured to allow welding of the top mounting side to an edge of the first mounting side adjacent to the notch.

11. The seismic sensor stake system according to claim 7, wherein the angled end of the first mounting side and the second mounting side are configured to insertion into the ground.

12. The seismic sensor stake system according to claim 7 further comprises a stake bit including a shank end and a stake bit end, the stake bit end having a shape corresponding with the first mounting side and the second mounting side.

13. The seismic sensor stake system according to claim 12, wherein the stake bit end is configured for insertion into the ground to create a hole in the ground corresponding with the first mounting side and the second mounting side for insertion of the seismic sensor stake into the ground.

14. A seismic sensor stake system for orientated three single-axis seismic sensors along three independent and separate axes, the seismic sensor stake system comprising:
   a seismic sensor stake comprising:
      a top mounting side including a top threaded member and a top retaining nut engageable with the top threaded member and configured to secure a first seismic sensor to the top mounting side along a top axis parallel with a longitudinal axis of the seismic sensor stake;
      a first mounting side including an angled end, a first threaded member and a first retaining nut engageable with the first threaded member and configured to secure a second seismic sensor to the first mounting side along a first axis orthogonal with the top axis; and
      a second mounting side including an angled end, a second threaded member and a second retaining nut engageable with the second threaded member and configured to secure a third seismic sensor to the second mounting side along a second axis orthogonal with the top axis and the first axis; and
      a stake bit including a shank end and a stake bit end, the stake bit end having a shape corresponding with the first mounting side and the second mounting side;
   wherein the angled end of the first mounting side and the second mounting side converge toward a single tip.

15. The seismic sensor stake system according to claim 14, wherein the top threaded member, the first threaded member and the second threaded member each are configured to be received in a slot defined in the first seismic sensor, the second seismic sensor and the third seismic sensor, respectively.

16. The seismic sensor stake system according to claim 15, wherein the top retaining nut, the first retaining nut and the second retaining nut each are configured to be rotatable upon rotation of the first seismic sensor, the second seismic sensor and the third seismic sensor when assembled with the top threaded member, the first threaded member and the second threaded member, respectively.

17. The seismic sensor stake system according to claim 14, wherein the top mounting side includes a notch defined in an edge of the top mounting side, the notch being configured to allow welding of the top mounting side to an edge of the first mounting side adjacent to the notch.

18. The seismic sensor stake system according to claim 14, wherein the angled end of the first mounting side and the second mounting side are configured to insertion into the ground.

19. The seismic sensor stake system according to claim 14, wherein the stake bit end is configured for insertion into the ground to create a hole in the ground corresponding with the first mounting side and the second mounting side for insertion of the seismic sensor stake into the ground.

* * * * *